(12) United States Patent
Nakamura

(10) Patent No.: US 7,311,078 B2
(45) Date of Patent: Dec. 25, 2007

(54) ENGINE CONTROL SYSTEM USING VALVE OPENING PARAMETER

(75) Inventor: Hiroshi Nakamura, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/700,014

(22) Filed: Jan. 31, 2007

(65) Prior Publication Data

US 2007/0179700 A1  Aug. 2, 2007

(30) Foreign Application Priority Data

Feb. 1, 2006 (JP) .............................. 2006-024669

(51) Int. Cl.
*F02D 13/04* (2006.01)
*F02D 13/00* (2006.01)
(52) U.S. Cl. .................... 123/321; 123/347; 123/90.15
(58) Field of Classification Search ................ 123/321, 123/322, 347, 90.1, 90.15; 701/103, 115
See application file for complete search history.

(56) References Cited

U.S. PATENT DOCUMENTS

| 4,570,592 | A | * | 2/1986 | Otobe | 123/339.23 |
| 5,797,369 | A | * | 8/1998 | Suzuki et al. | 123/436 |
| 6,390,063 | B1 | * | 5/2002 | Obata et al. | 123/399 |
| 6,655,345 | B2 | * | 12/2003 | Ogawa et al. | 123/295 |
| 7,222,594 | B2 | * | 5/2007 | Hoshino | 123/90.15 |
| 2002/0029757 | A1 | * | 3/2002 | Ogawa et al. | 123/295 |
| 2002/0059919 | A1 | * | 5/2002 | Ogawa et al. | 123/478 |
| 2006/0118071 | A1 | * | 6/2006 | Harada et al. | 123/90.16 |

FOREIGN PATENT DOCUMENTS

| JP | 2001-304029 | 10/2001 |
| JP | 2006-266093 | 10/2006 |

* cited by examiner

*Primary Examiner*—John T. Kwon
(74) *Attorney, Agent, or Firm*—Nixon & Vanderhye P.C.

(57) ABSTRACT

In a system, a calculating unit calculates a control parameter required for control of an engine based on a valve opening parameter each time a calculating timing repeatedly appears, and stores the control parameter in a predetermined area of the system. A reflecting unit reflects the control parameter in the control of the engine each time a reflecting timing repeatedly appears. A preliminary estimated timing setting unit sets a preliminary estimated timing between an input timing of the switching request and an estimated timing. The estimated timing represents that the valve opening parameter is estimated to be switched from a first value to a second value in response to the input timing of the switching request. A preliminary correcting unit corrects the control parameter based on at least the switched second value of the valve opening parameter when the preliminary estimated timing appears.

8 Claims, 8 Drawing Sheets

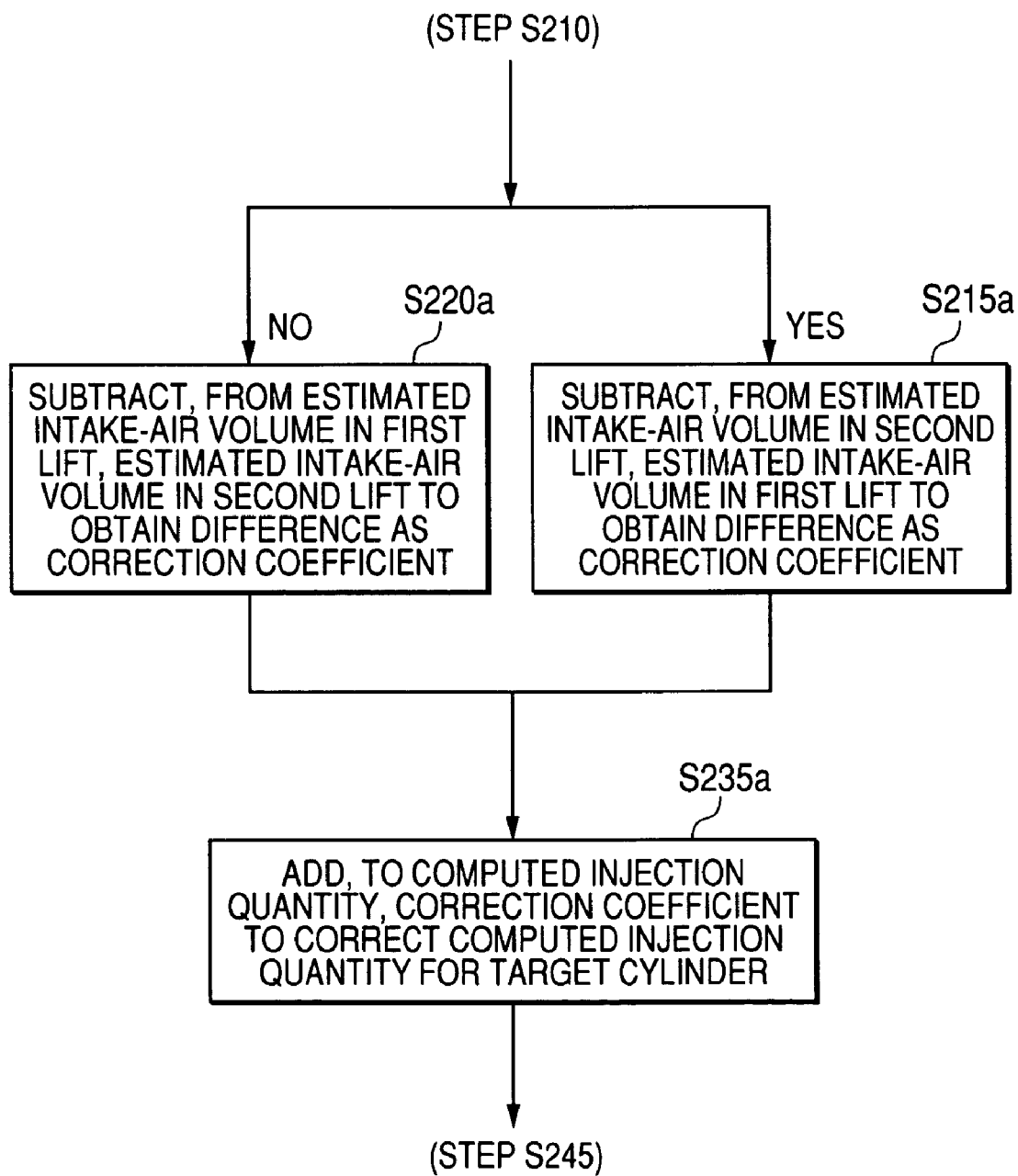

ENGINE CONTROL SYSTEM USING VALVE OPENING PARAMETER

CROSS REFERENCE TO RELATED APPLICATION

This application is based on Japanese Patent Application 2006-024669 filed on Feb. 1, 2006. This application aims at the benefit of priority from the Japanese Patent Application, so that the descriptions of which are all incorporated herein by reference.

BACKGROUND OF THE INVENTION

1. Field of the Invention

The present invention relates to engine control systems, which are capable of switching a valve opening parameter from a first value to a second value. The valve opening parameter means an opening of a valve to be used in an engine for controlling the flow of a fluid through the valve. For example, as one of the valve opening parameters, a valve lift defined as a physical distance from a valve to a corresponding seat, a valve opening timing, a valve opening period, or the like can be used.

2. Description of the Related Art

There are some of conventional internal combustion engines that are configured to switch, in response to an external switching request, from a predetermined first lift of at least one intake or exhaust valve to a predetermined second lift thereof; this at least one intake or exhaust valve has been installed in each cylinder of the internal combustion engines.

Because at least one control parameter required for a control unit to control an internal combustion engine depend on the first lift of the at least one intake or exhaust valve, it is necessary for the control unit to correct the at least one control parameter at proper timing to meet the second lift.

SUMMARY OF THE INVENTION

The inventor of this application has studied correction of at least one control parameter in response to switching of a first value of a valve opening parameter to a second value thereof. It is to be noted that the first and second values of a valve opening parameter, such as first and second different lifts, respectively means different openings of a valve to be used in an engine for controlling the flow of a fluid through the valve.

An example of the study by the inventor is disclosed in Japanese Unexamined Patent Publication No. 2006-266093.

During the study, the inventor has come to consider that it is important to properly determine timing when to correct a control parameter required to control the engine in response to switching from a first value of a valve opening parameter to a second value thereof.

Specifically, an object of at least one aspect of the present invention is to provide engine control systems, which are capable of properly determining timing when to correct a control parameter required to control an internal combustion engine in response to switching from a first value of a valve opening parameter to a second value thereof.

According to one aspect of the present invention, there is provided a system designed to switch a valve opening parameter of a valve installed in an engine from a first value to a second value in response to a switching request input thereto. The valve opening parameter is associated with an opening of the valve, and the valve works to control flow of a fluid therethrough. The system includes a calculating unit configured to calculate a control parameter required for control of the engine based on the valve opening parameter each time a calculating timing repeatedly appears, and to store the control parameter in a predetermined area of the system. The system includes a reflecting unit configured to reflect the control parameter stored in the predetermined area in the control of the engine each time a reflecting timing repeatedly appears. The system includes a preliminary estimated timing setting unit configured to set a preliminary estimated timing between an input timing of the switching request and an estimated timing. The estimated timing represents that the valve opening parameter is estimated to be switched from the first value to the second value in response to the input timing of the switching request. The system includes a preliminary correcting unit configured to correct the control parameter stored in the predetermined area based on at least the switched second value of the valve opening parameter when the preliminary estimated timing appears.

BRIEF DESCRIPTION OF THE DRAWINGS

Other objects and aspects of the invention will become apparent from the following description of embodiments with reference to the accompanying drawings in which:

FIG. 8 is a flowchart schematically illustrating part of an injection-quantity correcting task illustrated in FIG. 5 according to a modification of the present invention.

DETAILED DESCRIPTION OF EMBODIMENTS OF THE INVENTION

An embodiment of the present invention will be described hereinafter with reference to the accompanying drawings.

Figure 1:
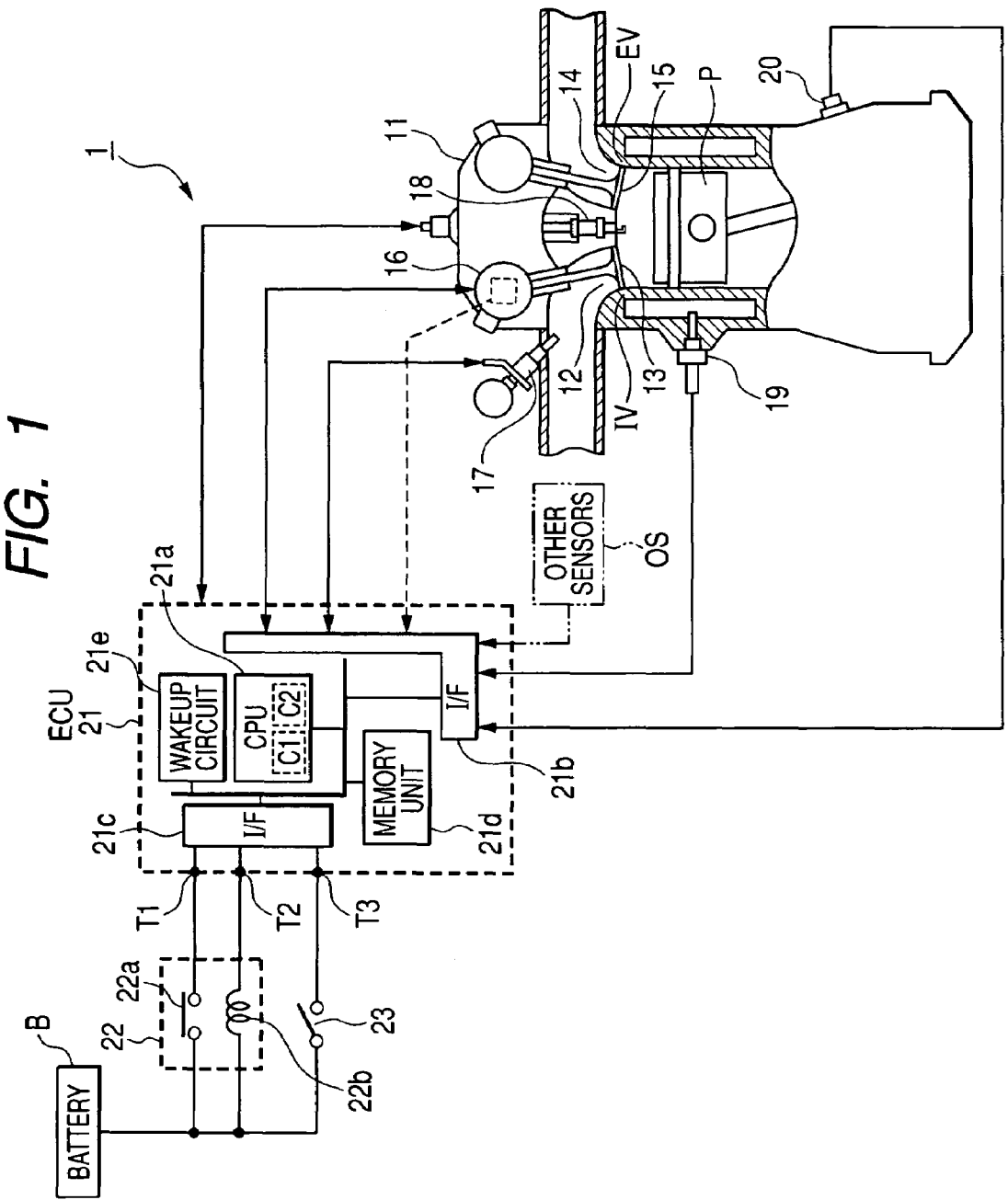
FIG. 1 is a view schematically illustrating an example of the structure of an engine control system according to an embodiment of the present invention.

Referring to FIG. 1, there is illustrated an engine control system 1 to which the present invention is applied.

The engine control system 1 is installed beforehand in a vehicle, such as an engine-driven vehicle. The engine control system 1 includes an engine, such as a four-stroke per cycle engine 11 as a target therefor, and an engine ECU (electronic control unit) 21 for controlling the engine 11. The engine ECU 21 will be referred to simply as "ECU 21" hereinafter.

The engine 11 includes, for example, straight-six cylinders that, for example, are integrated with each other to form a cylinder block. Each of the cylinders is formed at its head (cylinder head) with an intake port 12 and an exhaust port 14.

The intake port 12 serves as a passage in the cylinder head of each cylinder through which an air-fuel mixture allows to flow from an intake manifold of the engine 11. The exhaust port 14 serves as a passage in the cylinder head of each cylinder through which gases pass to an exhaust manifold of the engine 11.

The engine 11 includes an intake valve 13 and an exhaust valve 15 for each cylinder.

The intake valve 13 serves as a camshaft-driven valve installed in the cylinder head of a cylinder that opens to allow the air-fuel mixture from the intake port 12 to enter into the cylinder therethrough and closes to form part of the combustion chamber during the compression and power strokes of the four-stroke cycle.

The exhaust valve 15 serves as a camshaft-driven valve installed in the cylinder head of a cylinder that opens to allow burned exhaust gases to escape out of the cylinder and closes to form part of the combustion chamber during the compression and power strokes of the four-stroke cycle.

The cylinder head of a cylinder is formed with an intake valve seat IV, preferably machined, upon which the intake valve 13 is rested (seated) to be fully closed. Similarly, the cylinder head of a cylinder is formed with an exhaust valve seat EV, preferably machined, upon which the exhaust valve 15 is rested (seated) to be fully closed.

Specifically, the intake valve 13 is configured to be movable from the intake valve seat IV up to a predetermined position. When the intake valve 13 is moved to reach the predetermined position, the intake valve 13 is fully opened. Similarly, the exhaust valve 15 is configured to be movable from the exhaust valve seat EV up to a predetermined position. When the exhaust valve 13 is moved to reach the predetermined position, the exhaust valve 15 is fully opened.

In the embodiment, a lift of the intake valve 13 in a cylinder is defined as a distance between the position of the intake valve 13 being rested upon the intake valve seat IV and the predetermined position corresponding to the fully open position, Similarly, a lift of the exhaust valve 15 in a cylinder is defined as a distance between the position of the exhaust valve 15 being rested upon the exhaust valve seat EV and the predetermined position corresponding to the fully open position.

The engine 11 includes a spark plug 18 installed in the cylinder head of each cylinder to be inserted in the combustion chamber of each cylinder. The engine 11 also includes a cam profile switching actuator (variable valve-lift actuator) CPS actuator 16.

Specifically, in the embodiment, a camshaft (not shown) of the engine uses two different profiled cams (first and second cams) that can push the inlet valve 13 of each cylinder to two respective different lifts (first and second heights) as the camshaft rotates. The second lift corresponding to the second cam is longer than the first lift corresponding to the first cam.

Specifically, the CPS actuator 16 is mechanically linked to the camshaft and to switch between the first cam and the second cam of the camshaft so as to actually push the intake valve 13 of each of the individual cylinders. In addition, the CPS actuator 16 is filled with a lubricant, such as a suitable oil or grease; this lubricant allows friction and heat on operating parts of the CPS actuator 16 to be reduced. The CPS actuator 16 for example incorporates a lubricant temperature sensor L operative to continuously or periodically detect the temperature of the lubricant and to continuously or periodically output the detected lubricant temperature to the ECU 21.

For example, when switching from the second lift to the first lift, the CPS actuator 16 is configured to switch from the second cam of the camshaft to the first cam whereby to reduce the opening of the intake valve 13. In contrast, when switching from the first lift to the second lift, the CPS actuator 16 is configured to switch from the first cam of the camshaft to the second cam whereby to increase the opening of the intake valve 13.

The engine 11 includes an injector 17 installed in the cylinder head of each cylinder to be inserted in the intake port thereof. The injector 17 is configured to meter fuel into the intake manifold.

The engine 11 includes a coolant sensor 19 installed in the cylinder block. The coolant sensor 19 is operative to continuously or periodically measure a temperature of an engine coolant, and continuously or periodically output, to the ECU 21, measured data.

The engine 11 includes a crank angle sensor 20 installed in the cylinder block. The crank angle sensor 20 is operative to continuously or periodically measure a rotation angle of a crankshaft (not shown) of the engine 11, and continuously or periodically output, to the engine ECU 11, measured data.

In detail, the crank angle sensor 20 is operative to output, to the ECU 21, a pulse signal consisting of a train of pulses. Specifically, the crank angle sensor 20 is operative to output a pulse of the pulse signal each time the crankshaft rotates at a constant angle of, for example, 30 degrees crank angle.

The engine 11 includes other sensors OS arranged to measure various types of physical quantities associated with control of the engine 11.

For example, the other sensors OS include an airflow meter, a throttle position sensor, and an intake manifold pressure sensor.

The airflow meter is operative to continuously or periodically measure the flow of air through the intake manifold, and continuously or periodically output a measurement piece of data to the ECU 21.

The throttle position sensor is operative to continuously or periodically monitor information representing the throttle position of an intake throttle of the engine and to continuously or periodically output, to the ECU 21, the monitored throttle position information.

The intake manifold pressure sensor is operative to continuously or periodically measure the pressure in the intake manifold, and continuously or periodically output a measurement piece of data to the ECU 21.

In the embodiment, as described above, the engine 11 is designed to a four-stroke per cycle engine with straight-six cylinders to which #1 to #6 are assigned, respectively.

Specifically, in the individual cylinders of the engine 11, the intake stroke, the compression stroke, the power (combustion) stroke, and the exhaust stroke are repeatedly carried out in the order of the cylinders #2, #4, #1, #5, #3, and #6.

For example, during the intake stroke, the piston P starts at the top of the cylinder (TDC: Top Dead Center) of a cylinder, the intake valve 13 opens, and the piston P moves down to the bottom of the cylinder (BDC: Bottom Dead Center), creating a partial vacuum that draws the air-fuel mixture into the cylinder.

Next, during the compression stroke, the piston P moves back up toward TDC to compress the air-fuel mixture.

When the piston P reaches TDC, the spark plug 18 emits a spark to ignite the air-fuel mixture, so that the air-fuel mixture explodes, driving the piston P down during the combustion stroke.

When the piston P reaches the bottom of the cylinder (BDC: Bottom Dead Center) and moves from BDC toward TDC, the exhaust valve 15 opens so that the burned exhaust gases is forced out of the cylinder during the exhaust stroke.

It is to be noted that a group of the cylinders #2, #4, and #1 will be referred to as "first group A", and a group of the remaining cylinders #5, #3, and #6 will be referred to as "second group B".

The ECU 21 is designed as a normal computer circuit.

Specifically, the ECU 21 consists essentially of a CPU 21a, a first I/O interface 21b, a second I/O interface 21c, a memory unit 21d, a wakeup circuit 21e, and a bus 21f. The components 21b to 21e are electrically connected to the CPU 21a via the bus 21f.

The CPU 21a is operative to perform many tasks associated with control of the engine.

The CPS actuator 16, the injector 17, and the spark plug 18 are electrically connected to the CPU 21a via the first I/O interface 21b. In addition, the coolant temperature sensor 19, the crank angle sensor 20, and other sensors OS are also electrically connected to the CPU 21a via the first I/O interface 21b. The first I/O interface 21b is operative to convert each of the measurement pieces of data output from the sensors 19, 20, and OS into a form suitable for processing of the CPU 21a as need arises.

The ECU 21 includes a power terminal T1, a main-relay control terminal T2, and a key switch terminal T3 electrically connected to the second I/O interface 21c.

The power terminal T1 is electrically connected to a contact 22a of a main relay 22. The contact 22a of the main relay 22 is electrically connected to a battery B installed in the vehicle.

The main-relay control terminal T2 is electrically connected to a coil 22b of the main relay 22.

The key switch terminal T3 is electrically connected to an ignition switch 23 of the vehicle to which the battery B is connected.

When the ignition switch 23 is turned on, the wakeup circuit 21e of the ECU 21 is activated on, for example, low power supplied from the battery B via the ignition switch 23, whereby to turn the contact 22a of the main relay 22 on. This allows power to be supplied from the battery B to the CPU 21a and the like of the ECU 21 so that they are activated.

In contrast, when the ignition switch 23 is turned off, the CPU 21a of the ECU 21 turns the contact 22a of the main relay 22 off. This allows power to be interrupted from the battery B to the CPU 21a and the like of the ECU 21 so that they are shut down.

The memory unit 21d includes at least one ROM, such as a flash ROM, and at least one RAM. The at least one ROM stores therein a plurality of programs in advance. At least one of the programs causes the CPU 21a to execute various tasks associated with control of the engine based on the pieces of measured data output from the sensors 19 and 20 and other sensors; these various tasks include a task to control ignition timing for the individual cylinders and a task to control fuel injection quantities from the individual injectors 17.

Specifically, it is necessary to determine optimum fuel injection timings and an optimum fuel injection periods for the individual injectors 17 so as to control the fuel injection quantities therefrom.

In the embodiment, the present invention is applied to the task to control fuel injection quantities from the individual injectors 17.

Next, operations of the ECU 21 for performing the task to control fuel injection quantities from the individual injectors 17 will be described hereinafter. The operations of the ECU 21 for performing the task to control fuel injection quantities from the individual injectors 17 will be referred to as "injection-quantity control operations" hereinafter.

It is to be noted that the injection-quantity control operations of the ECU 21 are carried out by the CPU 21a cooperatively with the peripherals 21b to 21e.

Figure 2:
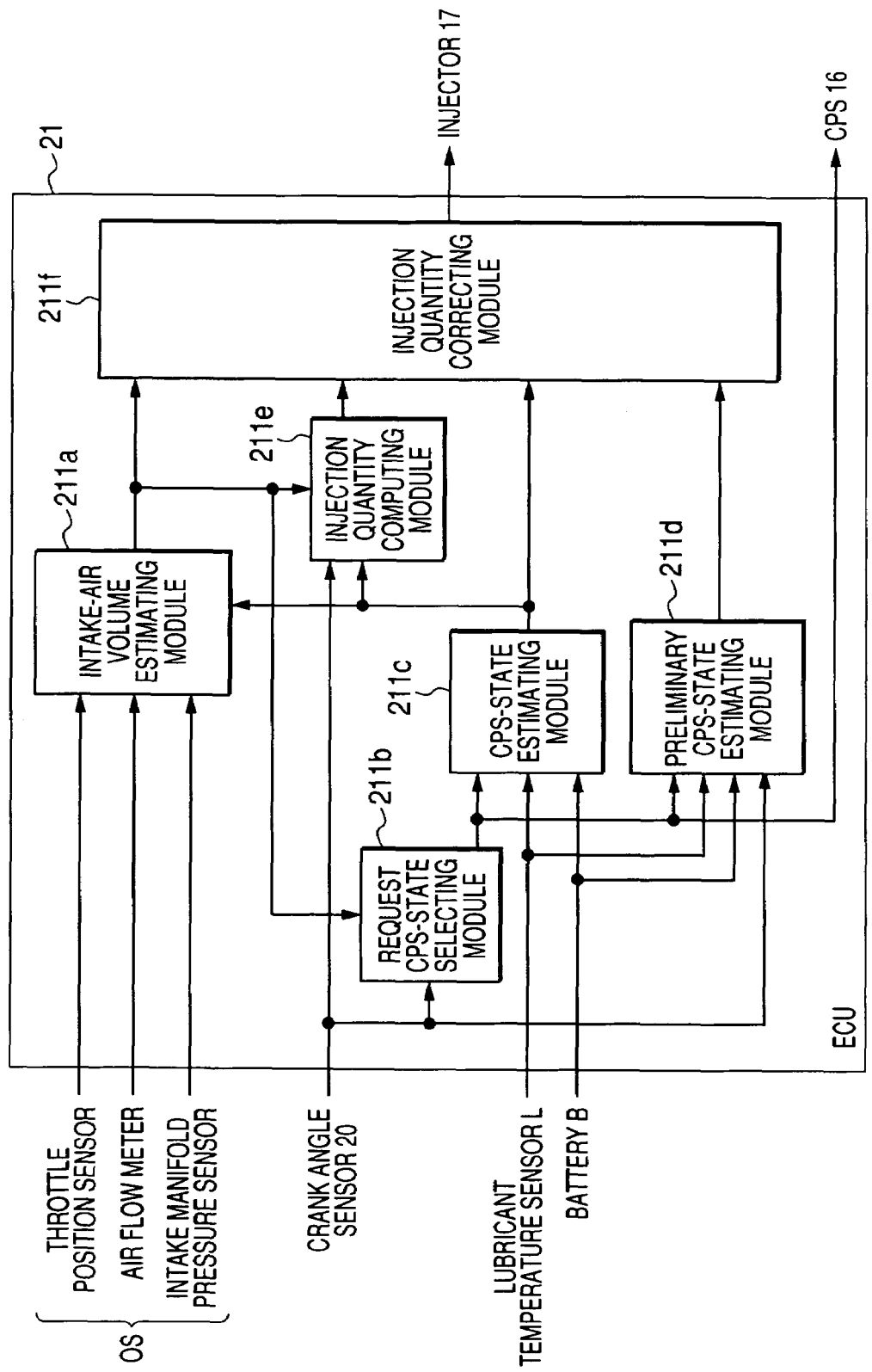
FIG. 2 is a block diagram schematically illustrating functional modules of an ECU illustrated in FIG. 1.

FIG. 2 schematically illustrates functional modules of the ECU 21 equivalently corresponding to the injection-quantity control operations thereof.

As illustrated in FIG. 2, the ECU 21 includes an intake air volume estimating module 211a, a request CPS-state selecting module 211b, a CSP-state estimating module 211c, a preliminary CPS-state estimating module 211d, an injection-quantity computing module 211e, and an injection-quantity correcting module 211f.

Specifically, the intake air volume estimating module 211a is operatively connected to the request CPS-state selecting module 211b, the CPS-state estimating module 211c and the injection-quantity correcting module 211f.

The intake air volume estimating module 211a estimates volume of the intake air-fuel mixture of the engine 11 as intake air volume based on estimated CPS-state data described hereinafter and the measurement pieces of data input from the other sensors OS (throttle position sensor, the air flow meter, and the intake manifold pressure sensor), whereby to set the estimation result (estimated intake air volume) as estimated intake air volume data.

The request CPS-state selecting module 211b is operatively connected to the CPS-state estimating module 211c and the preliminary CPS-state estimating module 211d.

The request CPS-state selecting module 211b selects any one of the first lift and second lift based on the pulse signal input from the crank angle sensor 20 and the estimated intake air volume data by the intake air volume estimating module 211a.

The request CPS-state selecting module 211b also sets request CPS-state data indicative of the selected one of the first and second lifts, and outputs the set request CPS-state data to the CPS 16. The request CPS-state data causes the CPS 16 to select one of the first and second cams that pushes the inlet valve 13 corresponding to the selected one of the first and second lifts.

The CPS-state estimating module 211c is operatively connected to the intake air volume estimating module 211a and the injection-quantity correcting module 211f.

The CPS-state estimating module 211c estimates which of the first lift and second lift is set as the lift of the intake valve 13 based on the request CPS-state data set by the module 211b, the lubricant temperature data input from the lubricant temperature sensor L, and the voltage supplied from the battery B. The battery B serves as the power source of the CPS actuator 16. Then, the CPS-state estimating module 211c sets estimated CPS-state data indicative of the estimated lift (first lift or second lift).

The preliminary CPS-state estimating module 211d is operatively connected to the injection-quantity correcting module 211f.

The preliminary CPS-state estimating module 211d preliminary estimates, before switching of the lift of the intake valve 13 by the CPS actuator 16, that the lift of the intake valve 13 is switched to which of the first lift and second lift based on the request CPS-state data set by the module 211b, the lubricant temperature data, the battery voltage, and the pulse signal input from the crank angle sensor 20. Then, the preliminary CPS-state estimating module 211d sets the preliminary estimated lift (first lift or second lift) as preliminary estimated CPS-state data.

The injection-quantity computing module 211e is operatively connected to the injection-quantity correcting module 211f.

Each time a predetermined injection-quantity computing timing appears, the injection-quantity computing module 211e computes an injection quantity of the air-fuel mixture based on the estimated intake air volume data set by the module 211a, the pulse signal input from the crank angle sensor 20, and the estimated CPS-state data set by the module 211c. This allows the computed injection quantity of the air-fuel mixture to be set as an injection quantity of the air-fuel mixture that is common to the individual cylinders.

For example, in the embodiment, the predetermined injection-quantity computing timing appears every time the crankshaft of the engine 11 rotate at a previously specified angle of, for example, 120 degrees crank angle. That is, the injection-quantity computing module 211e can detect the appearance of an injection-quantity computing timing based on the pulse signal input from the crank angle sensor 20.

Each time a predetermined injection-quantity computing timing appears, the injection-quantity correcting module 211f corrects, for each cylinder, the injection quantity of the air-fuel mixture computed by the module 211e based on the estimated intake air volume data set by the module 211a, the estimated CPS-state data set by the module 211c, and the preliminary estimated CPS-state data set by the module 211d.

In addition, each time a predetermined injection-quantity updating timing appears, the injection-quantity correcting module 211f outputs the corrected injection quantity for one of the injectors 17 to a corresponding one of the injectors 17, thereby updating a previously set injection quantity of one of the injectors 17 to the corrected injection quantity.

For example, in the embodiment, the predetermined injection-quantity updating timing appears every time the piston P of any one of the cylinders reaches or comes close to TDC. The crank angle of the crankshaft represents the position of the piston P of each cylinder, and therefore, the injection-quantity correcting module 211f can detect the appearance of an injection-quantity updating timing based on the pulse signal input from the crank angle sensor 20.

In the embodiment, the CPU 21a of the ECU 21 is programmed to sequentially execute instructions corresponding to the functional modules 211a to 211f, thereby implementing the functional modules 211a to 211f.

Specifically, the CPU 21a is programmed to sequentially store, in the RAM of the memory unit 21d, the estimated intake air volume data, the request CPS-state data, the estimated CPS-state data, the preliminary estimated CPS-state data, and the injection quantity. In addition, the CPU 21a is programmed to output the injection quantity and the request CPS-state data stored in the RAM to the injector 17 and the CPS actuator 16 via the first I/O interface 21b, respectively.

Next, instructions of a CPS-state estimating task to be executed by the CPU 21a will be described hereinafter in accordance with FIG. 3. It is to be noted that at least one program stored in the memory unit 21d allows the CPU 21a to repeatedly execute the CPS-state estimating task at regular intervals of, for example, 4 milliseconds [ms].

Figure 3:
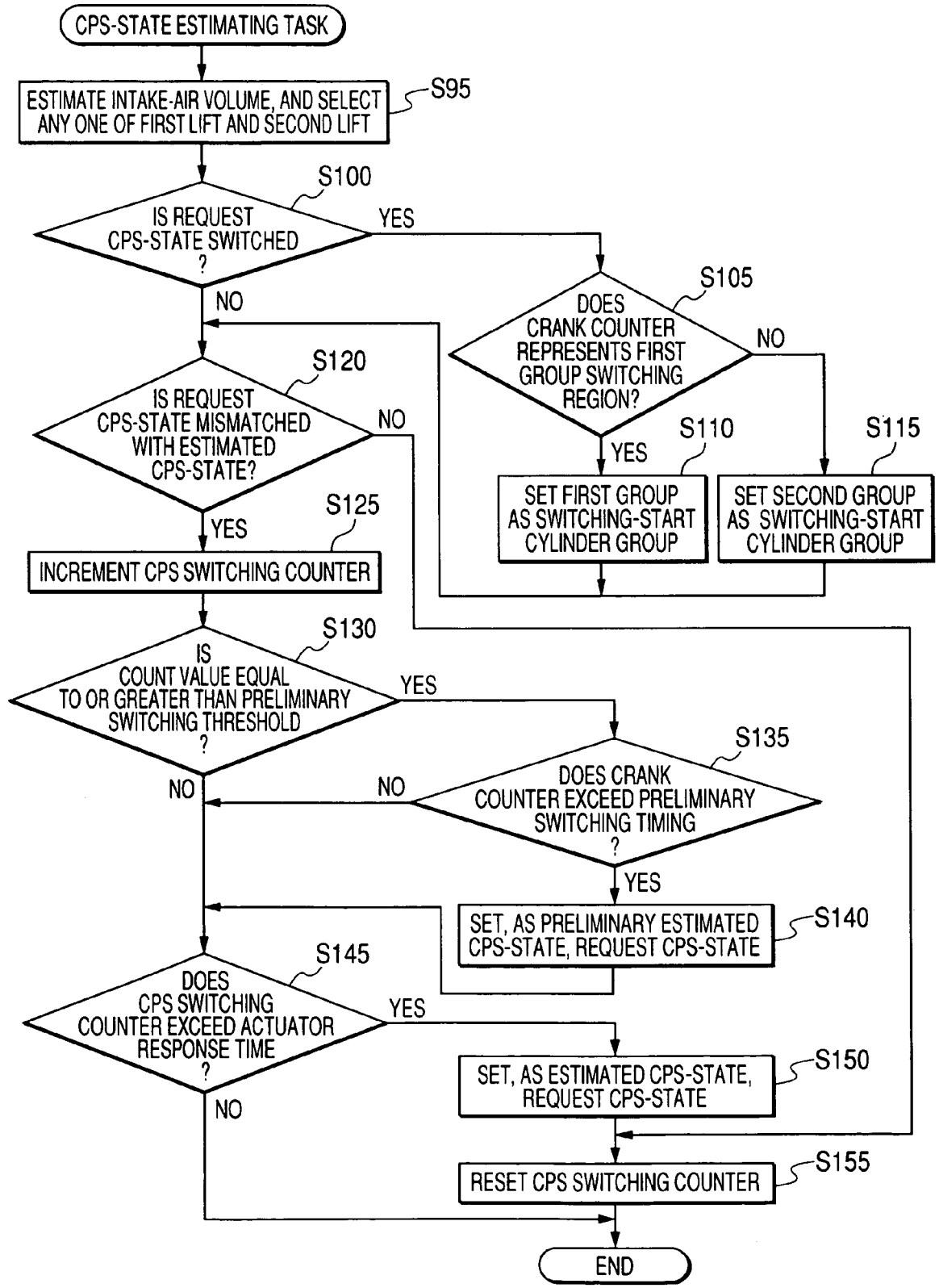
FIG. 3 is a flowchart schematically illustrating a CPS-state estimating task to be executed by the CPU of the ECU illustrated in FIG. 1 according to the embodiment.

As illustrated in FIG. 3, in the CPS-state estimating task, the CPU 21a estimates a current intake air volume of the air-fuel mixture of the engine 11 based on a previous estimated CPS-state data and current measurement pieces of data input from the throttle position sensor, the air flow meter, and the intake manifold pressure sensor. Then, the CPU 21a selects, as current request CPS-state data, any one of the first lift and second lift based on the pulse signal input from the crank angle sensor 20 and the estimated intake air volume data in step S95. In other words, the CPU 21a determines current request CPS-state data indicative of any one of the first lift and second lift to meet a current engine load, thereby storing it in the RAM.

Next, in step S100, the CPU 21a determines whether the current request CPS-state data is changed from the previous request CPS-state data stored in the RAM by the previous CPS-state estimating task.

When it is determined that the current CPS-state data is matched with the previous CPS-state data (the determination in step S100 is NO), the CPU 21a immediately shifts to step S120 described hereinafter.

Otherwise when it is determined that the current CPS-state data is changed from the previous CPS-state data (the determination in step S100 is YES), the CPU 21a proceeds to step S105.

In step S105, the CPU 21a determines whether a count value of a crank counter C1 lies within a predetermined count-value range corresponding to a first group switching region. It is to be noted that the CPU 21a can use one of its internal counters as the crank counter C1 or can operate the crank counter C1 by software.

In addition, in the embodiment, the predetermined count-value range corresponding to the first group switching region is set to a count value range from a fist count value corresponding to 360 degrees crank angle to a second count value corresponding to 690 degrees crank angle.

Similarly, a count-value range corresponding to a second group switching region is set to a count value range from a third count value corresponding to 0 degrees crank angle to a fourth count value corresponding to 330 degrees crank angle. It is also to be noted that one engine cycle consisting of the four strokes corresponds to 720 degrees crank angle.

Specifically, when it is determined that the count value of the crank counter C1 lies within the predetermined count-value range corresponding to the first group switching region (the determination in step S105 is YES), the CPU 21a goes to step S10.

In step S110, the CPU 21a sets the first group A of the cylinders #2, #4, and #1 as a switching-start cylinder group, shifting to step S120. Specifically, when the first group A of the cylinders #2, #4, and #1 are set as the switching-start cylinder group, switching of a current lift of the intake valve 13 is started from each of the cylinders #2, #4, and #1.

Otherwise when it is determined that the count value of the crank counter C1 lies out of the predetermined count-value range corresponding to the first group switching region (the determination in step S105 is NO), the CPU 21a goes to step S115.

In step S115, the CPU 21a sets the second group B of the cylinders #5, #3, and #6 as the switching-start cylinder group, shifting to step S120. Specifically, when the second group B of the cylinders #5, #3, and #6 are set as the switching-start cylinder group, switching of a current lift of the intake valve 13 is started from each of the cylinders #5, #3, and #6.

In step S120, the CPU 21a determines whether the lift represented by the request CPS-state data obtained in step S95 is mismatched with that represented by the previous estimated CPS-state data.

When it is determined that the lift represented by the request CPS-state data is matched with that represented by the previous estimated CPS-state data (the determination in step S120 is NO), the CPU 21a immediately shifts to step S155 described hereinafter.

Otherwise when it is determined that the lift represented by the request CPS-state data is mismatched with that represented by the previous estimated CPS-state data (the determination in step S120 is YES), the CPU 21a proceeds to step S125.

In step S125, the CPU 21a counts up a count value of a CPS switching counter C2 by 1. It is to be noted that the CPU 21a can use one of its internal counters as the CPS switching counter C2 or can operate the CPS switching counter C2 software. The CPS switching counter C2 represents a period of time that has elapsed since the request CPS-state was switched.

Thereafter, the CPU 21a determines whether the count value of the CPS switching counter C2 is equal to or greater than a predetermined preliminary switching threshold in step S130. It is to be noted that, as the preliminary switching threshold, a count value equivalent to a period obtained by subtracting, from an actuator response time of the CPS actuator 16, a period required for rotation of the crankshaft at 360 degrees crank angle. The period required for rotation of the crankshaft at 360 degrees crank angle is obtained beforehand by the CPU 21a based on the pulse signal input from the crank angle sensor 20.

Specifically, in step S130, the CPU 21a calculates the actuator response time of the CPS actuator 16 based on the lubricant temperature data input from the lubricant temperature sensor L, and the voltage supplied from the battery B. Thereafter, the CPU 21a determines whether the count value of the CPS switching counter C2 is equal to or greater than the preliminary switching threshold determined based on the calculated actuator response time in step S130.

That is, the actuator response time of the CPS actuator 16 represents an estimated period required for the CPS actuator 16 to switch from one of the first and second cams to the other thereof so as to switch from one of the first and second lifts to the other thereof. The actuator response time depends on the temperature of the lubricant in the CPS actuator 16 and the voltage of the battery B on which the CPS actuator 16 operates.

When it is determined that the count value of the CPS switching counter C2 is less than the predetermined preliminary switching threshold (the determination in step S130 is NO), the CPU 21a immediately shifts to step S145.

Otherwise if it is determined that the count value of the CPS switching counter C2 is equal to or greater than the predetermined preliminary switching threshold (the determination in step S130 is YES), the CPU 21a goes to step S135.

In step S135, the CPU 21a determines whether the count value of the crank counter C1 exceeds a predetermined threshold count value indicative of preliminary switching timing.

It is to be noted that, when the first group A is set as the switching-start cylinder group, a count value corresponding to an injection-quantity updating timing for the cylinder #6 in the second group B is determined in advance as the predetermined threshold count value. This is because the cylinder #6 in the second group B represents a cylinder whose injection-quantity updating timing appears one cylinder before the cylinder #2 in the first group A; switching of the lift of this cylinder #2 is carried out first in the first group A.

It is also to be noted that, when the second group B is set as the switching-start cylinder group, a count value corresponding to an injection-quantity updating timing for the cylinder #1 in the first group A is determined in advance as the predetermined threshold count value. This is because the cylinder #1 in the first group A represents a cylinder whose injection-quantity updating timing appears one cylinder before the cylinder #5 in the second group B; switching of the lift of this cylinder #5 is carried out first in the second group B.

When it is determined that the count value of the crank counter C1 is equal to or less than the predetermined threshold count value indicative of the preliminary switching timing (the determination in step S135 is NO), the CPU 21a immediately shifts to step S145.

Otherwise when it is determined that the count value of the crank counter C1 exceeds the predetermined threshold count value indicative of the preliminary switching timing (the determination in step S135 is YES), the CPU 21a proceeds to step S140.

In step S140, the CPU 21a sets, as preliminary estimated CPS-state data, the lift represented by the request CPS-state data.

Next, the CPU 21a determines whether the count value of the CPS switching counter C2 exceeds a count value corresponding to the actuator response time of the CPS actuator 16 in step S145.

When it is determined that the count value of the CPS switching counter C2 does not exceed the count value corresponding to the actuator response time of the CPS actuator 16 (the determination in step S145 is NO), the CPU 21a immediately exits the CPS-state estimating task.

Otherwise when it is determined that the count value of the CPS switching counter C2 exceeds the count value corresponding to the actuator response time of the CPS actuator 16 (the determination in step S145 is YES), the CPU 21a sets the lift represented by the estimated CPS-state data to that represented by the request CPS-state data in step S150.

Thereafter, the CPU 21a resets the count value of the CPS switching counter C2 in step S155, exiting the CPS-state estimating task.

Figure 4:
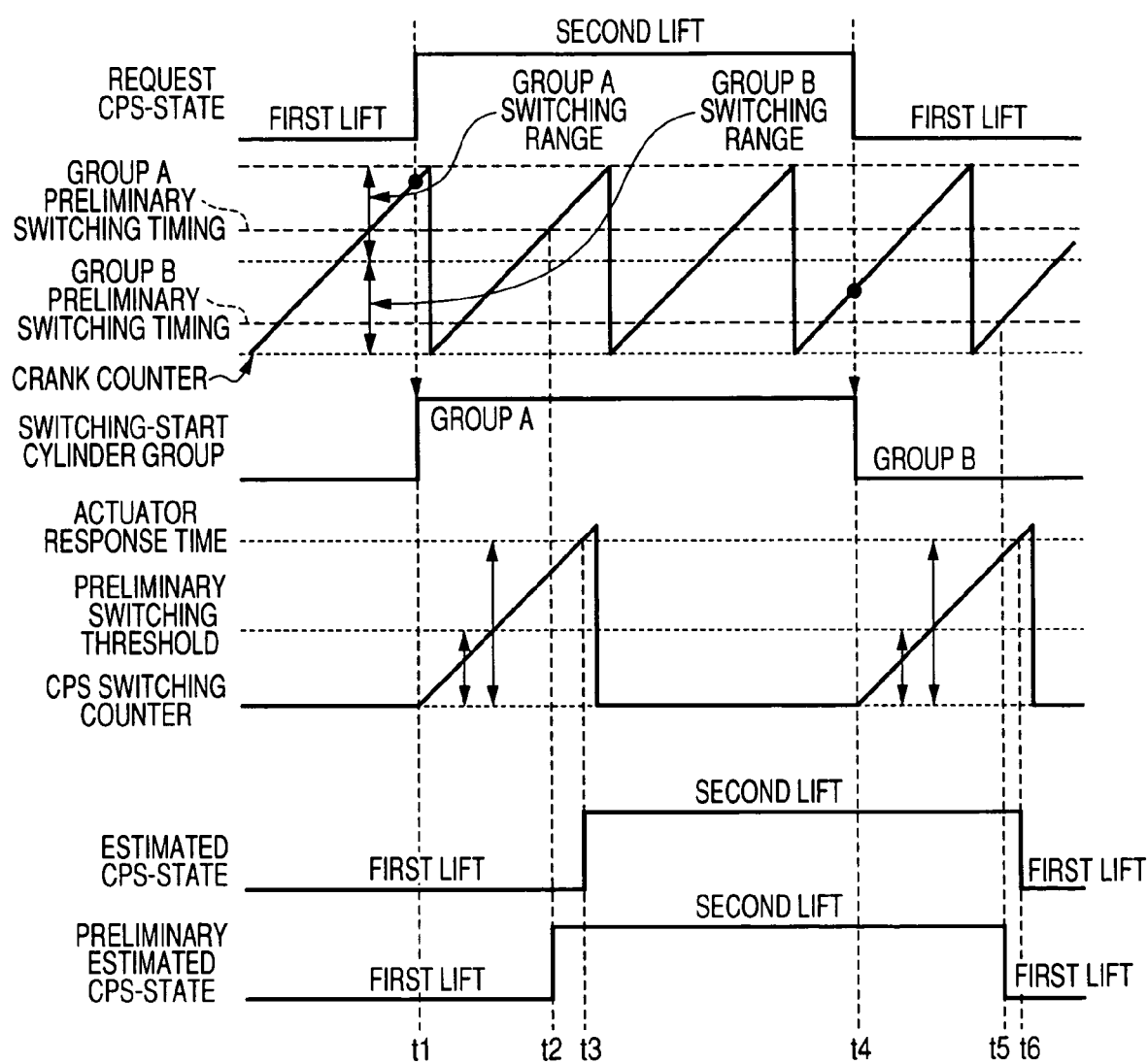
FIG. 4 is a timing chart schematically illustrating operations of the ECU based on the CPS-state estimating task executed by the CPU.

An example of the operations of the ECU 21 (the modules 211a to 211f) based on the CPS-state estimating task executed by the CPU 21a is illustrated in FIG. 4.

As illustrated in FIG. 4, when a previous request CPS-state data indicative of the first cam (first lift) is changed to a current request CPS-state data indicative of the second cam (second lift) at timing t1, the current request CPS-state date is sent to the CPS actuator 16.

When the count value of the crank counter C1 lies within the predetermined count-value range corresponding to the first group switching region, the first group A is set as the switching-start cylinder group at the timing t1 (see steps S100, S105, and S110), and the counting operation of the CPS switching counter C2 is started from its initial value (0) at the timing t1 (see step S125).

Thereafter, when the count value of the CPS switching counter C2 has exceeded the preliminary switching threshold, and the count value of the crank counter C1 reaches the predetermined threshold count value indicative of the preliminary switching timing, in other words, the injection-quantity updating timing for the cylinder #6, the preliminary estimated CPS-state data indicative of the first cam (first lift) is switched to the request CPS-state data indicative of the second cam (second lift) at timing t2 (see steps S130, S135, and S140).

Thereafter, when the count value of the CPS switching counter C2 reaches the count value corresponding to the actuator response time of the CPS actuator 16, the estimated CPS-state data indicative of the first cam (first lift) is switched to the request CPS-state data indicative of the second cam (second lift) at timing t3 (see steps S145 and S150).

In addition, when a previous request CPS-state data indicative of the second cam (second lift) is changed to a current request CPS-state data indicative of the first cam (first lift) at timing t4, the current request CPS-state date is sent to the CPS actuator 16.

When the count value of the crank counter C1 lies within the predetermined count-value range corresponding to the second group switching region, the second group B is set as the switching-start cylinder group at the timing t4 (see steps S100, S105, and S115), and the counting operation of the CPS switching counter C2 is started from its initial value (0) at the timing t4 (see step S125).

Thereafter, when the count value of the CPS switching counter C2 has exceeded the preliminary switching threshold, and the count value of the crank counter C1 reaches the predetermined threshold count value indicative of the preliminary switching timing, in other words, the injection-quantity updating timing for the cylinder #1, the preliminary estimated CPS-state data indicative of the second cam (second lift) is switched to the request CPS-state data indicative of the first cam (first lift) at timing t5 (see steps S130, S135, and S140).

Thereafter, when the count value of the CPS switching counter C2 reaches the count value corresponding to the actuator response time of the CPS actuator 16, the estimated CPS-state data indicative of the second cam (second lift) is switched to the request CPS-state data indicative of the first cam (first lift) at timing t6 (see steps S145 and S1150).

Specifically, in the embodiment, the instructions corresponding to the CPS-state estimating task allow the ECU 21 to set:

an estimated timing at which the lift of the intake valve 13 is estimated to be switched in response to the request CPS-state data input to the CPS actuator 16, which represents a timing when the estimated CPS-state data is estimated to be switched; and a preliminary estimated timing (preliminary switching timing) that appears before the estimated timing, which represents a timing when the preliminary CPS-state data is estimated to be switched.

In the CPS-state estimating task, determination of whether the count value of the CPS switching counter C2 is equal to or greater than the preliminary switching threshold can prevent the crankshaft of the engine 11 from rotating at 360 degrees crank angle until an estimated timing appears after appearance of a preliminary estimated timing.

Next, instructions of an injection-quantity correcting task to be executed by the CPU 21a will be described hereinafter in accordance with FIG. 5. It is to be noted that at least one program stored in the memory unit 21d allows the CPU 21a to repeatedly execute the injection-quantity estimating task every time the injection-quantity computing timing appears, in other words, every time the crankshaft rotates at the previously specified angle of 120 degrees crank angle.

Figure 5:
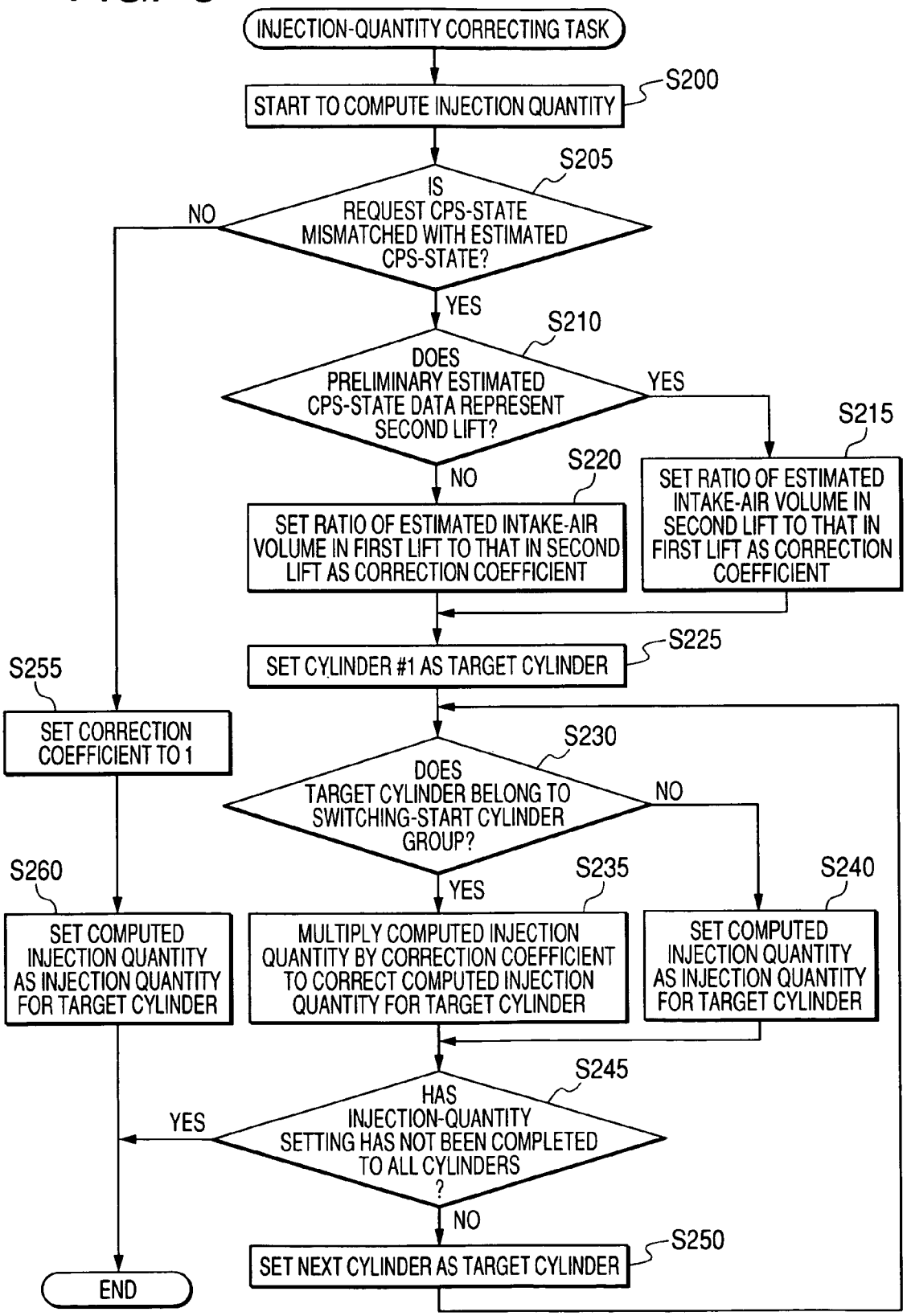
FIG. 5 is a flowchart schematically illustrating an injection-quantity correcting task to be executed by the CPU.

As illustrated in FIG. 5, in the injection-quantity correcting task, the CPU 21a starts an injection-quantity computing. Specifically, the CPU 21a starts to compute an injection quantity of the air-fuel mixture based on the estimated intake air volume data, the pulse signal, and the estimated CPS-state data, and after completion of the computing, stores the computed injection quantity in the RAM of the memory unit 21d in step S200.

Next, the CPU 21a determines whether the lift represented by the preliminary estimated CPS-state data is mismatched with that represented by the estimated CPS-state data in step S205. This allows determination of whether the preliminary estimating timing appears.

When it is determined that the lift represented by the preliminary estimated CPS-state data is mismatched with that represented by the estimated CPS-state data (the determination in step S205 is affirmative), the CPU 21a determines appearance of the preliminary estimating timing, shifting to step S210.

In step S210, the CPU 21a determines whether the preliminary estimated CPS-state data represents the second cam (second lift).

When it is determined that the preliminary estimated CPS-state data represents the second cam (second lift) (the determination in step S210 is YES), the CPU 21a sets a ratio of the estimated intake air volume of the air-fuel mixture in the second lift to that in the first lift as a correction coefficient in step S215, proceeding to step S225.

Otherwise when it is determined that the preliminary estimated CPS-state data represents the first cam (first lift) (the determination in step S210 is NO), the CPU 21a sets a ratio of the estimated intake air volume of the air-fuel mixture in the first lift to that of the air-fuel mixture in the second lift as the correction coefficient in step S220. Thereafter, the CPU 21a goes to step S225.

In step S225, the CPU 21a sets the cylinder #1 as a target cylinder for injection-quantity correction.

After the operation in step S225, in step S230, the CPU 21a determines whether the set target cylinder belongs to the switching-start cylinder group set by the CPS-state estimating task in FIG. 3.

When it is determined that the set target cylinder belongs to the switching-start cylinder group (the determination in step S230 is YES), the CPU 21a multiplies the computed injection quantify for the target cylinder stored in the RAM by the correction coefficient, thereby correcting the computed injection quantity as the injection quantity for the target cylinder in step S235. Thereafter, the CPU 21a shifts to step S245.

Specifically, the operation in step S235 allows the computed injection quantity stored in the RAM to be corrected to an injection quantity to which the target cylinder should be set immediately after switching of the lift of the target cylinder.

Otherwise when it is determined that the set target cylinder does not belong to the switching-start cylinder group (the determination in step S230 is NO), the CPU 21a sets the computed injection quantity stored in the RAM as an injection quantity for the target cylinder in step S240, proceeding to step S245.

In step S245, the CPU 21a determines whether injection-quantity setting has been completed to all of the cylinders.

When it is determined that injection-quantity setting has not been completed to all of the cylinders yet (the determination in step S245 is NO), the CPU 21a sets one of the remaining cylinders as the target cylinder in step S250, returning to step S230.

Otherwise if it is determined that injection-quantity setting has been completed to all of the cylinders (the determination in step S245 is YES), the CPU 21a exits the injection-quantity correcting task.

On the other hand, in step S205, when it is determined that the lift represented by the preliminary estimated CPS-state data is matched with that represented by the estimated CPS-state data (the determination in step S205 is NO), the CPU 21a determines no preliminary estimating timing appears, shifting to step S255.

In step S255, the CPU 21a resets the correction coefficient to "1", going to step S260.

In step S260, the CPU 21a sets the computed injection quantity stored in the RAM as an injection quantity for each of the cylinders, exiting the injection-quantity correcting task.

Figure 6:
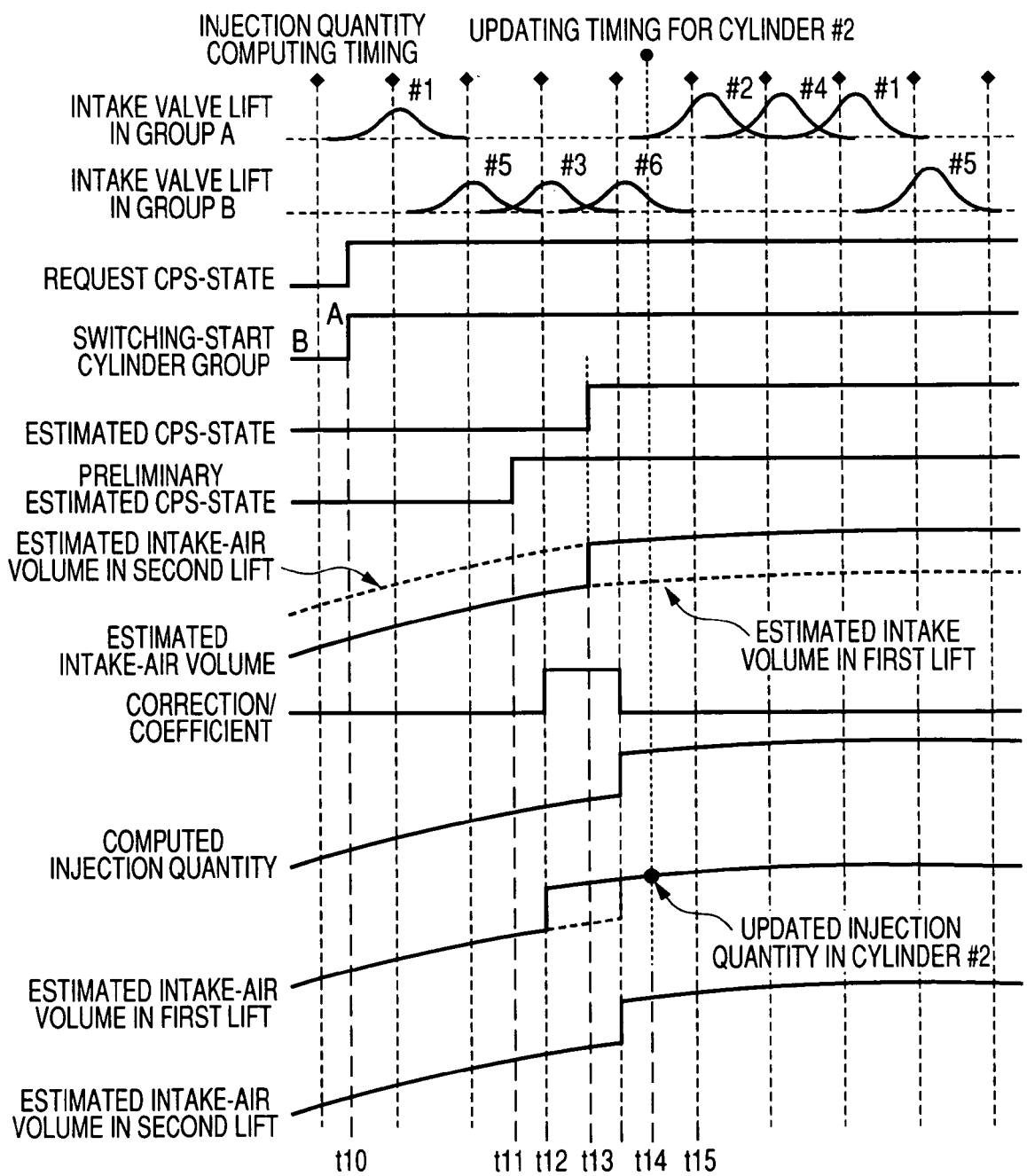
FIG. 6 is a timing chart schematically illustrating operations of the ECU based on the injection-quantity correcting task executed by the CPU.
Figure 7:
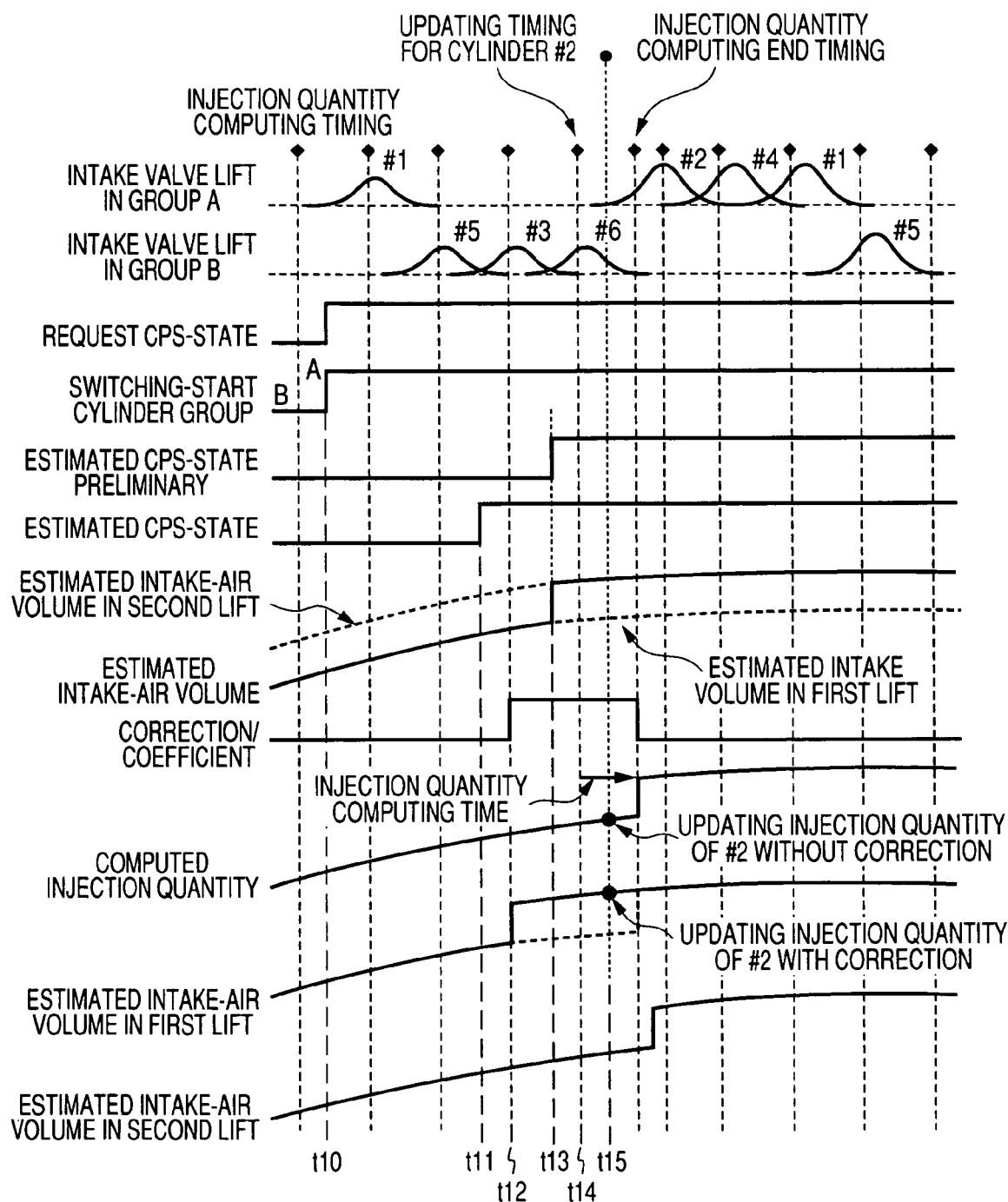
FIG. 7 is a timing chart schematically illustrating operations of the ECU based on the injection-quantity correcting task executed by the CPU.

Examples of the operations of the ECU 21 (the modules 211a to 211f) based on the injection-quantity correcting task executed by the CPU 21a are illustrated in FIGS. 6 and 7. It is to be noted that, in FIGS. 6 and 7, when one of the cylinders #1 to #6 whose lift is switched first is set to the cylinder #2 as the first target cylinder, the operations of the ECU 21 are illustrated.

As illustrated in FIG. 6, every time the injection-quantity computing timing appears, in other words, every time the crankshaft rotates at the previously specified angle of 120 degrees crank angle, computing of the injection quantity is started based on the currently set lift, such as first lift, of the CPS actuator 16 (see step S200 in FIG. 5).

When a previous request CPS-state data indicative of the first cam (first lift) is changed to a current request CPS-state data indicative of the second cam (second lift) at timing t10, the current request CPS-state date is sent to the CPS actuator 16. As illustrated in FIG. 4, the counting operation of the CPS switching counter C2 is started from its initial value (0) at the timing t10.

When the count value of the CPS switching counter C2 has exceeded the preliminary switching threshold, and the count value of the crank counter C1 reaches the predetermined threshold count value indicative of the preliminary switching timing, the preliminary estimated CPS-state data indicative of the first cam (first lift) is switched to the request CPS-state data indicative of the second cam (second lift) at timing t11 (see steps S130, S135, and S140 in FIG. 3). This allows the preliminary estimated timing (preliminary switching timing) to appear at timing t11.

After the appearance of the preliminary estimated timing t11, at the next injection-quantity computing timing t12 appearing subsequent to the preliminary estimated timing, the determination in step S250 becomes affirmative so that the correction efficient is set the value in step S215 or S220.

In addition, at the injection-quantity computing timing t12, the injection quantity stored in the RAM for the target cylinder #2 is first corrected based on the set correction coefficient, and the remaining cylinders #1 and #4 in the switching-start cylinder group (first group A) are sequentially corrected based on the set correction coefficient (see repetitions of steps S230 and S235).

In contrast, the injection quantities of the remaining cylinders in the second group B are kept to the injection quantities stored in the RAM (see repetitions of steps S230 and S240).

After the timing t12, when the count value of the CPS switching counter C2 reaches the count value corresponding to the actuator response time of the CPS actuator 16, the estimated CPS-state data indicative of the first lift is switched to the request CPS-state data indicative of the second lift at timing t13 (see steps S145 and S150). This allows the estimated timing to appear at timing t13.

The estimated timing t13 means the switching of the CPS actuator 16 from the first cam (first lift) to the second cam (second lift) is estimated to be completed.

Therefore, after the appearance of the estimated timing t13, at the next injection-quantity computing timing t14 appearing subsequent to the estimated timing, the determination in step S250 becomes negative so that the correction efficient is reset to "1" (see step S255).

In addition, at the injection-quantity computing timing t14, computing of the injection quantity is started based on the switched lift (second lift) of the CPS actuator 16 (see steps S200 in FIG. 5).

As illustrated in FIG. 6, for example, because the computing of the injection quantity based on the switched lift (second lift) is completed at the timing t14, the injection quantities for the cylinders in the first and second groups are set to the computed injection quantity based on the switched lift (second lift) (see step S260).

Thereafter, as illustrated in FIG. 6, when an updating timing for the cylinder #2 appears at timing t15, the corrected injection quantity for the cylinder #2 stored in the RAM is output to the cylinder #2 so that the previously set injection quantity of the cylinder #2 is reflected to be updated to the corrected injection quantity.

For example, when next updating timings for the cylinders #4 and #1 sequentially appear, the corrected injection quantities for the respective cylinders #4 and #1 stored in the RAM are sequentially output to the cylinders #4 and #1 so that the previously set injection quantities of the cylinders #4 and #1 are sequentially reflected to be updated to the corrected injection quantities, respectively.

Similarly, the previously set injection quantities of the cylinders #5, #3, and #6 in the second group B are sequentially reflected to be updated to the injection quantities stored in the RAM at respective updating timings. In contrast, as illustrated in FIG. 7, when the computing of the injection quantity based on the switched lift (second lift) is not completed until a next updating timing for the cylinder #2 appears at timing t15, in response to the updating timing for the cylinder #2, the corrected injection quantity for the cylinder #2 stored in the RAM is output to the cylinder #2 so that the previously set injection quantity of the cylinder #2 is reflected to be updated to the corrected injection quantity.

Similarly, though the next updating timings for the cylinder #4 and #1 appear, the computing of the injection quantity based on the switched lift (second lift) is not completed, the corrected injection quantities for the cylinders #4 and #1 stored in the RAM can be output to them. This allows the previously set injection quantities of the cylinders #4 and #1 to be updated to the corresponding corrected injection quantities.

As described above, when a preliminary estimated timing (preliminary switching timing) for a target cylinder appears in synchronization with an updating timing is input to the ECU 21 according to the embodiment, the ECU 21 works to correct a previously computed injection quantity for the target cylinder in response to switching of the lift corresponding thereto.

Accordingly, even if a period from when an estimated timing appears and an updating timing for the target cylinder appears is short so that computing of a new injection quantity based on a switched lift of the CPS actuator 16 cannot be completed until the updating timing appears, it is possible to securely update a previously set injection quantity of the target cylinder to the corrected injection quantity.

Specifically, if the engine 11 is controlled based on a previously set injection quantity of a cylinder corresponding to a lift mismatched with a current lift of the CPS actuator 16, this would result in engine performance deterioration, such as rapidly torque fluctuations and/or a bad air/fuel ratio.

In the embodiment of the present invention, however, secure update of a previously set injection quantity of a target cylinder to a corrected injection quantity based on a switched lift makes it possible to avoid engine performance deterioration.

In addition, the ECU 21 according to the embodiment works to identify at least one cylinder (group of cylinders) from which switching of a corresponding at least one lift is started, and to determine a preliminary estimated timing to be associated with the identification timing. This can match the timing when at least one lift is switched with the timing when a previously set injection quantity of the at least one cylinder is corrected to meet the switched lift.

The ECU 21 according to the embodiment works to correct merely a previously computed injection quantity of at least one cylinder from which switching of a lift is started. This can prevent the remaining cylinder(s) from which switching of a lift is not started from being corrected, making it possible to continue proper control of the engine 11.

The ECU 21 according to the embodiment works to set the correction coefficient to "1" at an injection-quantity computing timing appearing subsequent to an estimated timing, whereby to terminate the injection-quantity correcting task. This allows a previously set injection quantity of a cylinder to be updated to an injection quantity newly computed based on a switched lift. Thus, it is possible to properly control the engine 11 using the injection quantity that meets a current engine load.

In addition, it is possible for the ECU 21 according to the embodiment to:

determine an injection quantity for a cylinder during a period from which an estimated timing appears and request CPS-state data for switching a lift of the cylinder is switched;

control an intake valve 13 of the cylinder to open based on the switched lift; and cause an injector of the cylinder to inject the determined injection quantity in response to switching of the lift.

In the embodiment, the ECU 21 is configured such that an updating timing appears after an estimated timing appears, but can be configured such that an updating timing appears before an estimated timing appears.

In the embodiment, the ECU 21 is configured to correct target cylinders contained in the same group using a common correction coefficient. The ECU 21 can be configured to individually calculate correction coefficients respectively corresponding to the target cylinders, and to individually correct previously computed injection quantities respectively corresponding to the target cylinders. In this modification, it is possible to properly correct individually previously computed injection quantities of the target cylinders. This allows the engine 11 to be more properly controlled in response to switching of a lift of each cylinder.

In the embodiment, the ECU 21 is configured to multiply a computed injection quantify by a ratio of an estimated intake air volume of an air-fuel mixture in a lift before switching and that of the air-fuel mixture in a lift after switching, thereby correcting the computed injection quantity.

As illustrated in FIG. 8, in place of the operations in steps S215, S220, and S235, the ECU 21 can be configured to:

subtract, from an estimated intake air volume of an air-fuel mixture in a second lift after switching, and that of the air-fuel mixture in a first lift before switching to obtain a difference as a correction coefficient (see step S215a);

subtract, from an estimated intake air volume of an air-fuel mixture in a first lift before switching, and that of the air-fuel mixture in a second lift after switching to obtain a difference as a correction coefficient (see step S220a); and add, to a computed injection quantify, the correction coefficient, thereby correcting the computed injection quantity (see step S235a).

In the embodiment, the present invention is applied to control of an injection quantity of each cylinder (injector) as a control parameter to be used for engine control, but the present invention is not limited to the application. Specifically, the present invention can be applied to control another control parameter required to control the engine 11, such as ignition timing for each cylinder.

In the embodiment, the ECU 21 is configured to switch a lift of the intake valve 13, but the present invention is not limited to the structure.

Specifically, the ECU 21 can be configured to switch a lift of the exhaust valve 15 of each cylinder, and therefore, can be configured to control the engine 11 based on switching of the lift of the exhaust valve 15 of each cylinder.

In the embodiment, the present invention is applied to control of a four-stroke per cycle engine with straight-six cylinders, but the present invention is not limited to the structure.

Specifically, the present invention can be applied to control of another type engine. For example, the present invention can be applied to control of another type engine whose cylinders have an intake valve and an exhaust valve at least one of which is designed to switch between a lift of at least one of the intake and exhaust valves and another lift.

In the embodiment, as a valve opening parameter, a valve lift defined as a physical distance from a valve (the intake valve 13 or the exhaust valve 15) to the corresponding valve seat (valve seat IV or EV) is used, but the present invention is not limited to the structure.

Specifically, as another valve opening parameter, a valve opening timing, valve closing timing, or a valve opening period can be used.

While there has been described what is at present considered to be the embodiment and modifications of the present invention, it will be understood that various modifications which are not described yet may be made therein, and it is intended to cover in the appended claims all such modifications as fall within the true spirit and scope of the invention.

What is claimed is:

1. A system designed to switch a valve opening parameter of a valve installed in an engine from a first value to a second value in response to a switching request input thereto, the valve opening parameter being associated with an opening of the valve, the valve working to control flow of a fluid therethrough, the system comprising:

a calculating unit configured to calculate a control parameter required for control of the engine based on the valve opening parameter each time a calculating timing repeatedly appears, and to store the control parameter in a predetermined area of the system;

a reflecting unit configured to reflect the control parameter stored in the predetermined area in the control of the engine each time a reflecting timing repeatedly appears;

a preliminary estimated timing setting unit configured to set a preliminary estimated timing between an input timing of the switching request and an estimated timing, the estimated timing representing that the valve opening parameter is estimated to be switched from the first value to the second value in response to the input timing of the switching request; and a preliminary correcting unit configured to correct the control parameter stored in the predetermined area based on at least the switched second value of the valve opening parameter when the preliminary estimated timing appears.

2. A system according to claim 1, wherein the preliminary estimated timing setting unit is configured to set the preliminary estimated timing in synchronization with one of the reflecting timings.

3. A system according to claim 1, wherein the valve includes a plurality of intake valves and a plurality of exhaust valves, the engine includes a plurality of cylinders, each of the intake values being installed in one of the cylinders and opening to allow the fluid to enter thereinto so that combustion is generated in one of the cylinders based on the fluid, each of the exhaust valves being installed in one of the cylinders and opening to allow gases in the one of the cylinders to escape out thereof, further comprising:

a cylinder identifying unit configured to identify, according to the input timing of the switching signal, one of the cylinders from which the switching of the valve opening parameter from the first value to the second value is started so that an order of the switching of the valve opening parameter among the cylinders is determined, the preliminary estimated timing setting unit being configured to set the preliminary estimated timing between the input timing of the switching request and appearance of the estimating timing in the identified one of the cylinders.

4. A system according to claim 1, wherein the valve includes a plurality of intake valves and a plurality of exhaust valves, the engine includes a plurality of cylinders, each of the intake values being installed in one of the cylinders and opening to allow the fluid to enter thereinto so that combustion is generated in one of the cylinders based on the fluid, each of the exhaust valves being installed in one of the cylinders and opening to allow gases in the one of the cylinders to escape out thereof, the calculating unit is configured to calculate the control parameter for each of the cylinders and to store the control parameter for each of the cylinders in the predetermined area, further comprising:

a cylinder identifying unit configured to identify, according to the input timing of the switching signal, one of the cylinders from which the switching of the valve opening parameter from the first value to the second value is started so that an order of the switching of the valve opening parameter among the cylinders is determined, the preliminary correcting unit being configured to merely correct one of the control parameters stored in the predetermined area, the one of the control parameters corresponding to the identified one of the cylinders.

5. A system according to claim 1, wherein the valve includes a plurality of intake valves and a plurality of exhaust valves, the engine includes a plurality of cylinders, each of the intake values being installed in one of the cylinders and opening to allow the fluid to enter thereinto so that combustion is generated in one of the cylinders based on the fluid, each of the exhaust valves being installed in one of the cylinders and opening to allow gases in the one of the cylinders to escape out thereof, the calculating unit is configured to calculate the control parameter for each of the cylinders and to store the control parameter for each of the cylinders in the predetermined area, when at least two of the cylinders are set to be targets of control, the preliminary correcting unit being configured to individually correct the control parameters stored in the predetermined area.

6. A system according to claim 1, further comprising:

a state parameter estimating unit configured to estimate, based on the first value of the valve opening parameter, a first state parameter indicative of a state of the engine, and estimate, based on the second value of the valve opening parameter, a second state parameter indicative of the state of the engine, wherein the preliminary correcting unit is configured to multiply the control parameter by a ratio between the first state parameter and the second state parameter so as to correct the control parameter.

7. A system according to claim 1, further comprising:

a state parameter estimating unit configured to estimate, based on the first value of the valve opening parameter, a first state parameter indicative of a state of the engine, and estimate, based on the second value of the valve opening parameter, a second state parameter indicative of the state of the engine, wherein the preliminary correcting unit is configured to add, to the control parameter, a difference between the first and second state parameters so as to correct the control parameter.

8. A system according to claim 1, wherein the preliminary correcting unit is configured to terminate the correction of the control parameter when one of the calculating timings appears.

* * * * *